No. 825,953. PATENTED JULY 17, 1906.
D. M. BALCH.
PROCESS OF EXTRACTING POTASSIUM CHLORID FROM SEAWEED.
APPLICATION FILED OCT. 27, 1904.
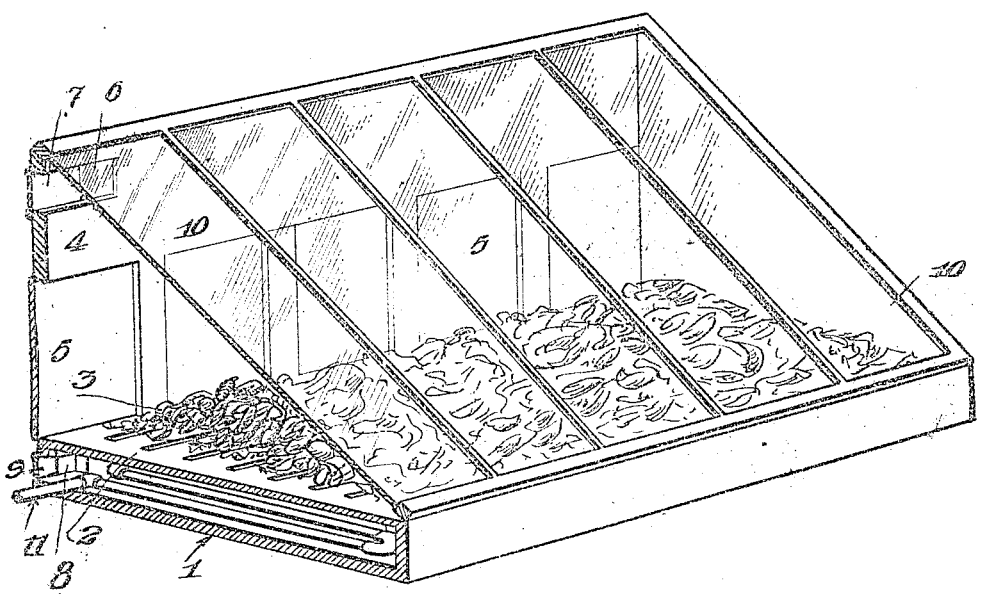
Witnesses
Inventor
David M. Balch
By Hazard & Harpham
Attorneys

UNITED STATES PATENT OFFICE.

DAVID M. BALCH, OF CORONADO, CALIFORNIA, ASSIGNOR OF ONE-HALF TO ANSON P. STEPHENS, OF CORONADO, CALIFORNIA.

PROCESS OF EXTRACTING POTASSIUM CHLORID FROM SEAWEED.

No. 825,953. Specification of Letters Patent. Patented July 17, 1906.

Application filed October 27, 1904. Serial No. 230,273.

*To all whom it may concern:*

Be it known that I, DAVID M. BALCH, a citizen of the United States, residing at Coronado, in the county of San Diego and State of California, have invented new and useful Improvements in Processes for Extracting Potassium Chlorid from Fuci and Algæ, of which the following is a specification.

In a patent granted to me December 15, 1902, No. 747,291, I described a process for extracting said salts from seaweed and in said process described therein that the first step was to thoroughly sun-dry the weeds, after which they were coarsely cut or broken up. Experience obtained since said patent was granted has demonstrated that the preliminary operation as described in said patent will not save all of the salts contained in said weeds. The weeds in their natural condition as they come from the salt water are of considerable bulk and weight. They contain very little cellulose and are composed chiefly of vegetable jelly saturated with alkaline salts inclosed within a tough elastic skin or wall of tissue, which give the plants their form. When these plants are exposed to conditions which evaporate, drive off, or diminish their watery parts, their form shrinks and their saline constituents begin to appear on the surface of the weed in the form of a delicate efflorescence or in crystalline crusts. Now if the weeds while drying are freely exposed to the weather unprotected by an inclosure, even though it be rainless, a large portion of the exuded salts is removed by the wind and night-dews and is lost.

It is the object of my invention to save these exuded salts and also by proper management and control of heat, moisture, and air to separate from the jelly that contained it and bring to the surface of the weed as much of its saline matter as is practicable. I accomplish this object by the process described herein, and I have illustrated in the accompanying drawing an apparatus used in carrying out my improved process, the drawing being a perspective view of a drying-house with the end broken away for clearness of illustration, in which the seaweeds are dried.

The floor 1 is formed of any suitable material which is impervious to moisture. At a suitable distance above the floor is a lattice-work platform 2, upon which the seaweeds 3 are placed to be dried. In the back wall 4 are doors 5, which may be opened for placing the weeds upon the drying-platform and to enable the same to be removed when desired. Suitable openings 6, controlled by dampers 7, are provided near the top of the back wall to permit the moisture from the plants to escape out of the drier. Openings 8, controlled by dampers 9, are provided near the bottom of the back wall to regulate the amount of air that is permitted to enter the drier. The top of the drier is preferably slanting and formed of a glass frame 10, so that the heat of the sun may be utilized in drying the weeds. I have provided a coil of steam-pipes 11 to dry the weeds, through which steam from a source of supply (not shown) is passed. Any other means may be used for furnishing artificial heat to dry the weeds. After the weeds are thoroughly dried the exuded salts can be separated therefrom by beating the same lightly or by other mechanical agitation, after which the dried weeds may be treated as described in my Patent No. 747,291. The exuded salts obtained by this process are a nearly pure potassium chlorid and may constitute about forty per cent. of the salts contained in the weeds as they come from the ocean.

At first evaporation is pushed as rapidly as possible with full sunshine and ventilation; but when the material has lost about one-half of its weight and an efflorescence of salts begins to appear on the bladders and fleshy stems of the weeds the heat and air supply are to be diminished, for the outer skin or membrane of the plant is now in condition under the influence of the moist air surrounding it to separate and bring to the surface the saline constitutents of the vegetable jelly contained in the weed. This process, which can best be described and explained as a crude form of dialysis, goes on as long as the skin of the plant is in a condition to perform its functions. When the weeds are well covered with a heavy efflorescence, they are to be dried off rapidly by full sun and air supply, after which the exuded salts are separated, as before described. The process is easily applicable to large masses of raw material and yields very satisfactory results, the salts usually amounting to forty per cent. of the total amount contained in the weed and sometimes a greater per cent. The salts are cleanly and perfectly separated from the vegetable jelly that contained them—a feat not before accomplished as a result of a manufacturing process, except by destroying the jelly by fire—and are a nearly pure potassium chlorid.

Having described my invention, what I claim as new, and desire to secure by Letters Patent, is—

The herein-described process of obtaining potassium chlorid from seaweeds which consists in first sweating and drying the weeds in an inclosure and then separating the exuded salts therefrom by mechanical agitation.

In witness that I claim the foregoing I have hereunto subscribed my name this 18th day of October, 1904.

DAVID M. BALCH.

Witnesses:
J. L. FREELAND,
E. T. OFFICER.